(12) United States Patent
Galasso et al.

(10) Patent No.: US 10,637,225 B1
(45) Date of Patent: Apr. 28, 2020

(54) IN-FLOOR ELECTRICAL FITTING

(71) Applicant: The Wiremold Company, West Hartford, CT (US)

(72) Inventors: Marc Galasso, Beacon Falls, CT (US); Timothy S. Bowman, Canton, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 0 days.

(21) Appl. No.: 16/424,973

(22) Filed: May 29, 2019

Related U.S. Application Data

(63) Continuation of application No. 15/964,458, filed on Apr. 27, 2018, now Pat. No. 10,320,171, which is a continuation of application No. 15/589,076, filed on May 8, 2017, now Pat. No. 9,960,585, which is a continuation of application No. 15/223,441, filed on Jul. 29, 2016, now Pat. No. 9,692,219, which is a continuation of application No. 14/739,392, filed on Jun. 15, 2015, now Pat. No. 9,490,616.

(51) Int. Cl.
*H02G 3/08* (2006.01)
*H02G 3/18* (2006.01)
*H02G 3/04* (2006.01)
*H02G 3/14* (2006.01)

(52) U.S. Cl.
CPC .......... *H02G 3/185* (2013.01); *H02G 3/0412* (2013.01); *H02G 3/083* (2013.01); *H02G 3/14* (2013.01)

(58) Field of Classification Search
CPC ........ H02G 3/085; H02G 3/185; H02G 15/10; H02G 3/08; H02G 3/12; H02G 3/088; H02G 3/0412; H02G 3/083; H02G 3/14; H02G 3/0418; H05K 5/00; H05K 5/02; H05K 5/0247; H05K 5/03; H01R 13/46; H01R 13/533; H01H 19/04; H01H 19/16
USPC ........ 174/480, 481, 482, 483, 486, 490, 50; 220/3.2–3.9, 4.02
See application file for complete search history.

(56) References Cited

U.S. PATENT DOCUMENTS

| | | | | |
|---|---|---|---|---|
| 2,092,367 | A * | 9/1937 | Breitenstein | H02G 3/14 220/3.94 |
| 6,417,446 | B1 * | 7/2002 | Whitehead | H02G 3/185 174/484 |
| 6,750,395 | B2 * | 6/2004 | Stout | H02G 3/185 174/483 |
| 7,053,296 | B2 * | 5/2006 | Drane | H02G 3/0493 174/483 |

(Continued)

*Primary Examiner* — Angel R Estrada
(74) *Attorney, Agent, or Firm* — McCormick, Paulding & Huber, PLLC

(57) ABSTRACT

An in-floor electrical fitting has a lower body that includes two half-bodies made of intumescent material. Each half-body includes a removable access wall that is also made of intumescent material and that is inserted into slots formed in the half-body. The removable access wall has at least one reduced-thickness section that can be broken off from the removable access wall to create a passageway through the removable access wall. During installation, the two access walls can be removed to allow an installer to a lay a conduit that will pass through the passageway through each access wall when the access walls are reinserted. An installer can pass power wires from one small compartment to another through the conduit while complying with code requirements calling for the separation of power and data cables.

20 Claims, 10 Drawing Sheets

(56) References Cited

U.S. PATENT DOCUMENTS

| | | | | |
|---|---|---|---|---|
| 7,183,503 B2 * | 2/2007 | Bowman | ................. | H02G 3/185 |
| | | | | 174/483 |
| 7,635,110 B2 * | 12/2009 | Galasso | ................. | H02G 3/185 |
| | | | | 174/483 |
| 7,678,993 B2 * | 3/2010 | Jolly | ..................... | H02G 3/185 |
| | | | | 174/480 |
| 8,063,317 B2 * | 11/2011 | Bowman | ................. | H02G 3/185 |
| | | | | 174/480 |
| 8,242,365 B2 * | 8/2012 | Galasso | ................. | H02G 3/185 |
| | | | | 174/483 |
| 8,878,058 B2 * | 11/2014 | Wurms | ................... | H02G 3/08 |
| | | | | 174/482 |
| 8,921,712 B1 * | 12/2014 | Gretz | ..................... | H02G 3/12 |
| | | | | 174/487 |

* cited by examiner

IN-FLOOR ELECTRICAL FITTING

CROSS-REFERENCE TO RELATED APPLICATIONS

This application is a continuation of U.S. application Ser. No. 15/964,458, filed Apr. 27, 2018, which is a continuation of U.S. application Ser. No. 15/589,076, filed May 8, 2017, which is a continuation of U.S. application Ser. No. 15/223,441, filed Jul. 29, 2016, which is a continuation of U.S. application Ser. No. 14/739,392, filed Jun. 15, 2015, each of which is hereby incorporated herein by reference in its entirety.

TECHNICAL FIELD

The present disclosure relates to in-floor electrical fittings.

BACKGROUND

In-floor electrical fittings provide power and data connections at the floor-level in the interior of a room so that power and data cables do not have to be routed to the room walls to make the necessary electrical connections, thereby preventing tripping hazards and improving room aesthetics. For example, one or more in-floor fittings could be installed below a conference table so that power and data cables connected to electronic devices sitting on the table can connect to building AC power and building computer networks without extending past the footprint of the table.

One particular category of in-floor electrical fittings is a poke-through fitting. A poke-through fitting passes through the entire thickness of a concrete floor so that power and data cables can be connected through the plenum space between the room floor of one building floor and the ceiling of the building floor below. As such, power and data cables do not need to be routed to the fitting through conduits within the concrete floor itself. Because poke-through fittings pass completely through the concrete floor, they are required by code to have a fire rating as good as the fire rating of the floor.

Some in-floor fittings employ intumescent material inside of them to improve their fire ratings. Intumescent material rapidly expands when heated, thereby closing openings within the fitting so that a fire cannot pass through those openings. Because poke-through fittings must have the same or better firing rating as the floor, intumescent material is sometimes used in poke-through fittings.

There is a need in the art for more versatile intumescent structures inside of in-floor electrical fittings.

DETAILED DESCRIPTION

Figure 1:
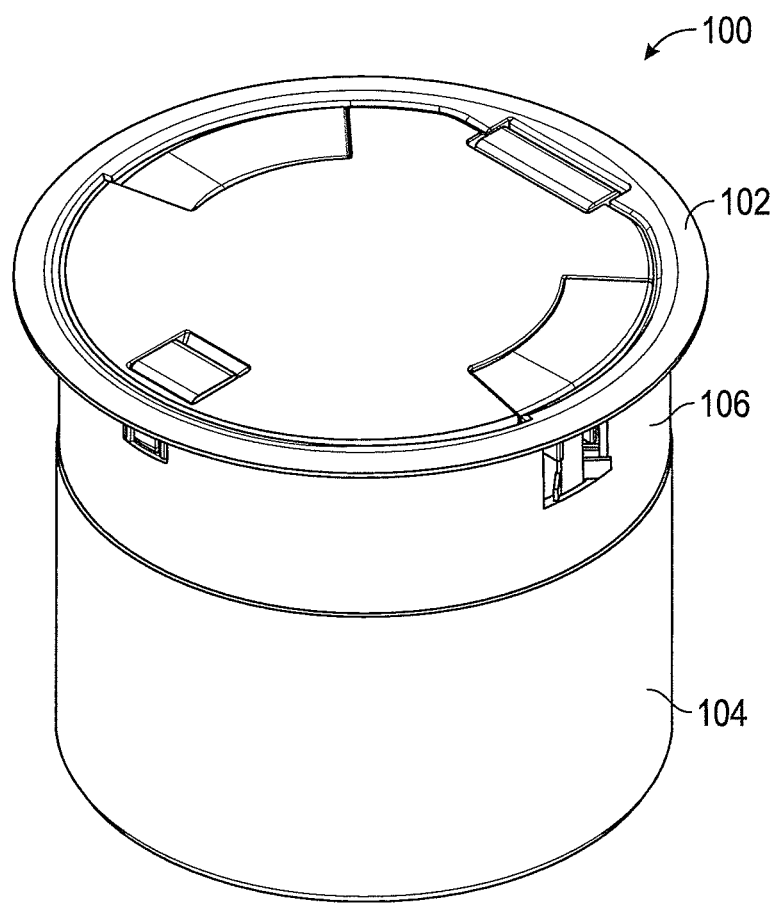
FIG. 1 is a perspective view of an exemplary in-floor fitting in accordance with the present disclosure.

FIG. 1 shows a perspective view of an exemplary in-floor fitting 100 in accordance with the present disclosure. In-floor fitting 100 is a poke-through fitting. It should be understood, however, that the present disclosure is not limited to poke-through fittings. Poke-through fitting 100 includes a cover assembly 102, a housing 104, and an upper body 106. Upper body 106 is made of intumescent material. Housing 104 is made of metal, for example, steel.

Figure 2:
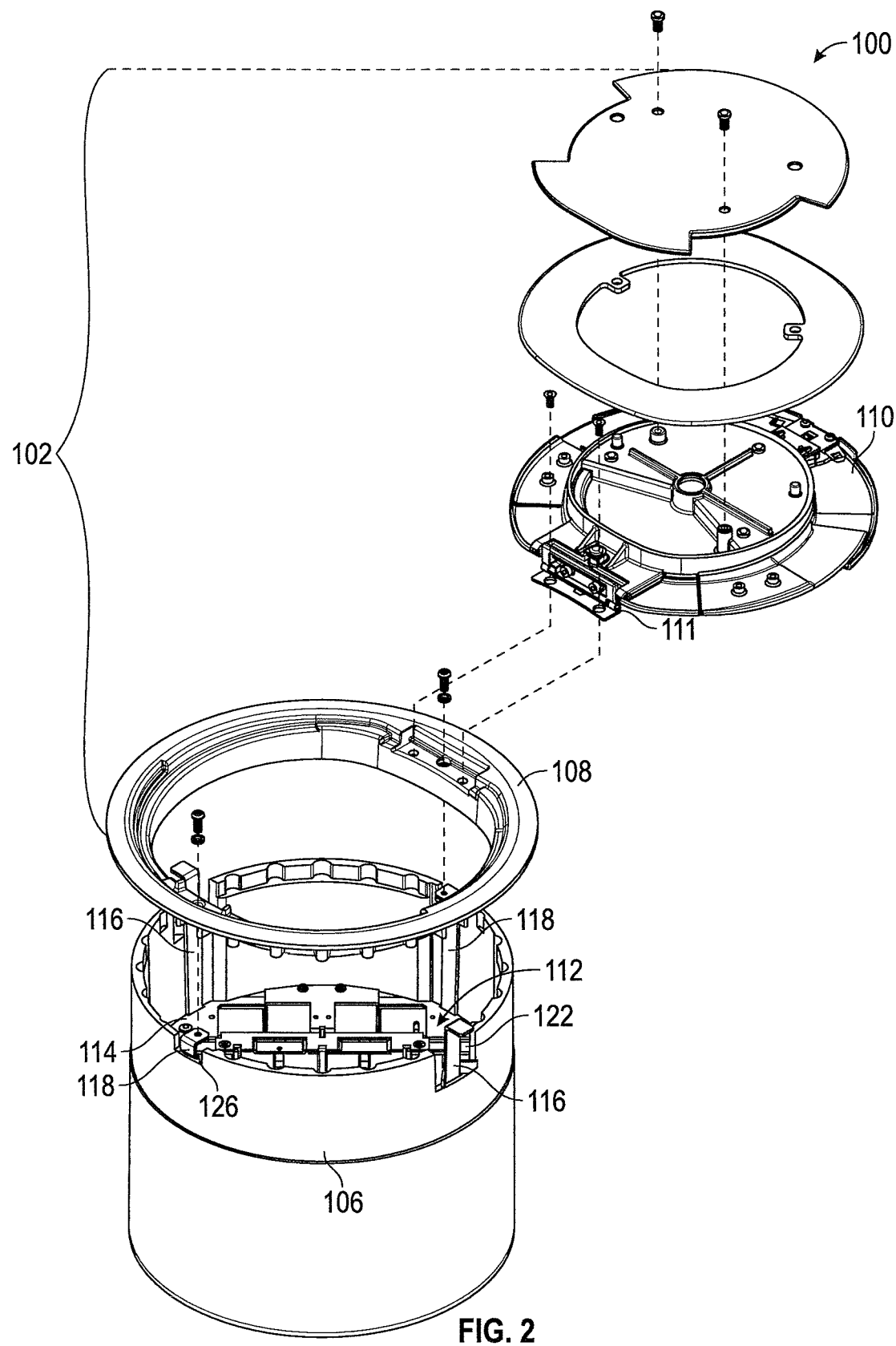
FIG. 2 is a partially exploded view of the in-floor fitting shown in FIG. 1.

FIG. 2 shows a partially exploded view of in-floor fitting 100. As shown in FIG. 2, cover assembly 102 includes a ring portion 108, a lid portion 110, and a hinge 111. Cover assembly 102 may also include a handle, gaskets, and openings for cords to pass through (not shown), as generally disclosed in U.S. Pat. No. 7,635,110 to Galasso et al., which issued on Dec. 22, 2009 and which is hereby incorporated by reference in its entirety. In-floor fitting 100 also includes a spider bracket assembly 112. Spider bracket assembly 112 includes a main bracket 114 for supporting mounting plates retaining power and data receptacles. Main bracket 114 (along with additional brackets attached to it as further described below) supports the mounting plates so that the front surfaces of the power and data receptacles retained thereon face upwards and are recessed below the top surface of the fitting. Spider bracket assembly 112 also includes two retention legs 116 and two cover legs 118 that extend upward from the outer periphery of the main bracket 114.

Figure 3:
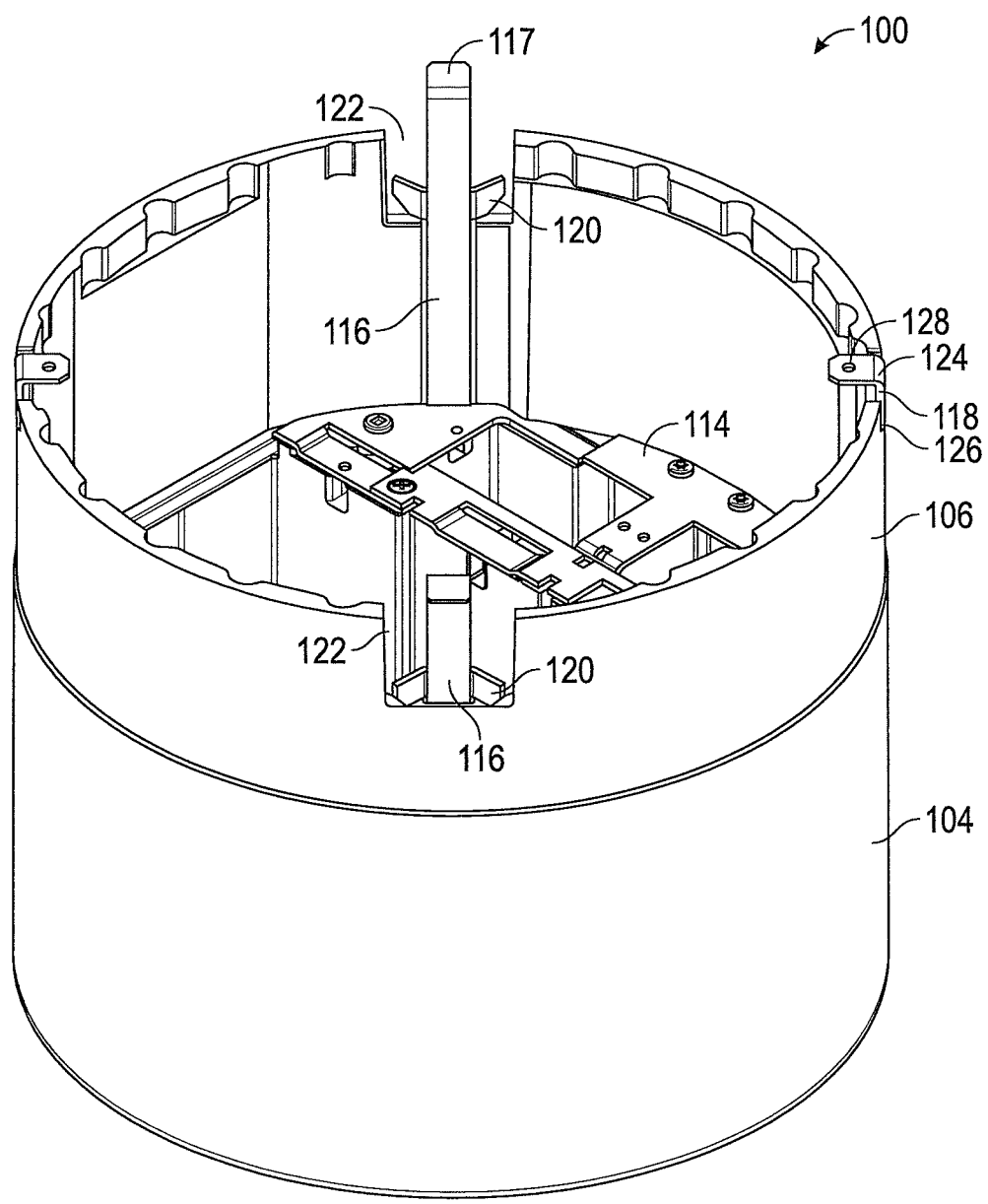
FIG. 3 is a perspective view of the in-floor fitting shown in FIG. 1 with the cover removed.

FIG. 3 shows a perspective view of the in-floor fitting 100 with the cover removed. As shown in FIG. 3, each retention leg 116 includes a barb 120 that passes through an opening 122 in the upper body 106. When the fitting is installed in a concrete floor, barb 120 presses against the concrete to help secure the fitting. The top of each retention leg also contains a bent portion 117 that is attached to the ring portion 108 of the cover assembly. Each cover leg 118 includes a curved top portion 124. The curved portion rests in an opening 126 (see FIG. 2) at the top of the upper body 106. The curved portion includes a screw hole 128 for attaching the cover assembly 102.

Figure 4A:
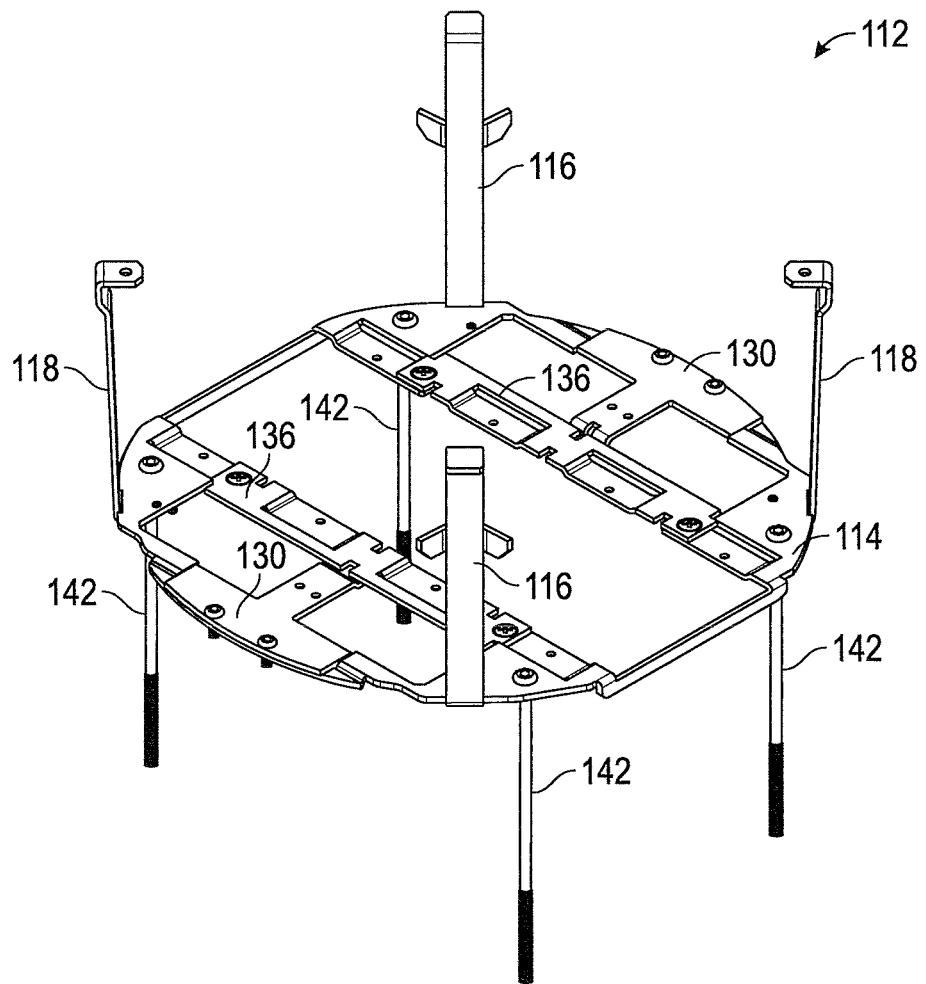
FIG. 4A is a perspective view of a spider bracket assembly of the exemplary in-floor fitting shown in FIG. 1.
Figure 4B:
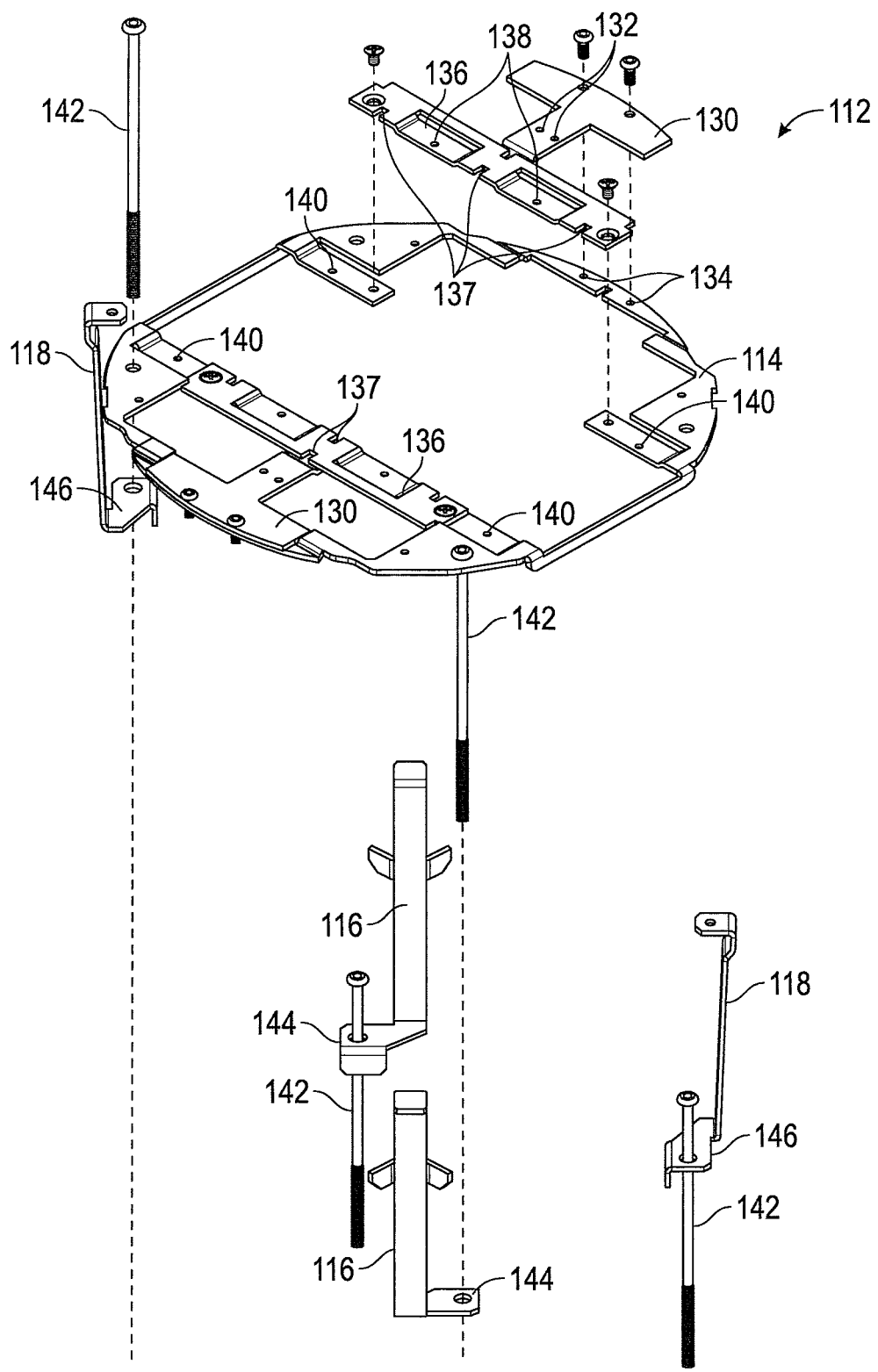
FIG. 4B is a partially exploded view of the spider bracket assembly shown in FIG. 4A.

FIGS. 4A and 4B show, respectively, a perspective view and a partially exploded view of the spider bracket assembly 112 of fitting 100. In addition to main bracket 114, retention legs 116, and cover legs 118, spider bracket assembly can include two side-compartment gang plates 130 that are screwed on to main bracket 114. Each side-compartment gang plate 130 includes two screw holes 132 that complement screw holes 134 on main bracket 114 to allow, when side-compartment gang plate is mounted to main bracket 114, for the mounting of a mounting plate 133 (shown in FIG. 5) with a non-standard opening that can fit a simplex or duplex power-receptacle unit or a data-receptacles unit 135 (shown in FIG. 5). When side-compartment gang plate 130 is attached, two duplex power-receptacle units (four total receptacles) can be installed end-to-end on each side of the fitting 100. Alternatively, gang plate 130 can be removed to allow for attachment of a mounting plate (not shown) that has a NEMA-compliant—NEMA stands for "National Electrical Manufacturers' Association"—opening that can fit a standard duplex power-receptacle unit (not shown) (the same as or similar to the units installed in ordinary wall boxes) or a standard data-receptacles unit (not shown). Spider bracket assembly 112 also includes two main-compartment gang plates 136 that are screwed on to main bracket 114. Each main-compartment gang plate 136 includes two screw holes 138 that in addition to four screw holes 140 on main bracket 114 can be used to, for example, secure mounting plates for four single-gang power- or data-receptacles to be mounted side-by-side in the middle of the fitting 100. The gang plate 136 also includes slits 137. Spider bracket assembly 112 also includes four long shank screws 142 that secure the spider bracket assembly 112 to the bottom of housing 104. As can be seen in FIG. 4B, each retention leg 116 has a flange 144 with a hole through which a long-shank screw 142 passes to help retain the retention leg to the spider bracket assembly. Flange 144 also includes a vertical portion that fits within a similarly-sized opening in the lower body 148 that is described below. Similarly, each cover leg 118 has a flange 146 with a hole through which a long-shank screw 142 passes to help retain the cover leg to the spider bracket assembly. Flange 146 also includes a vertical portion that fits within a similarly sized opening in the lower body 148 that is described below.

Figure 5:
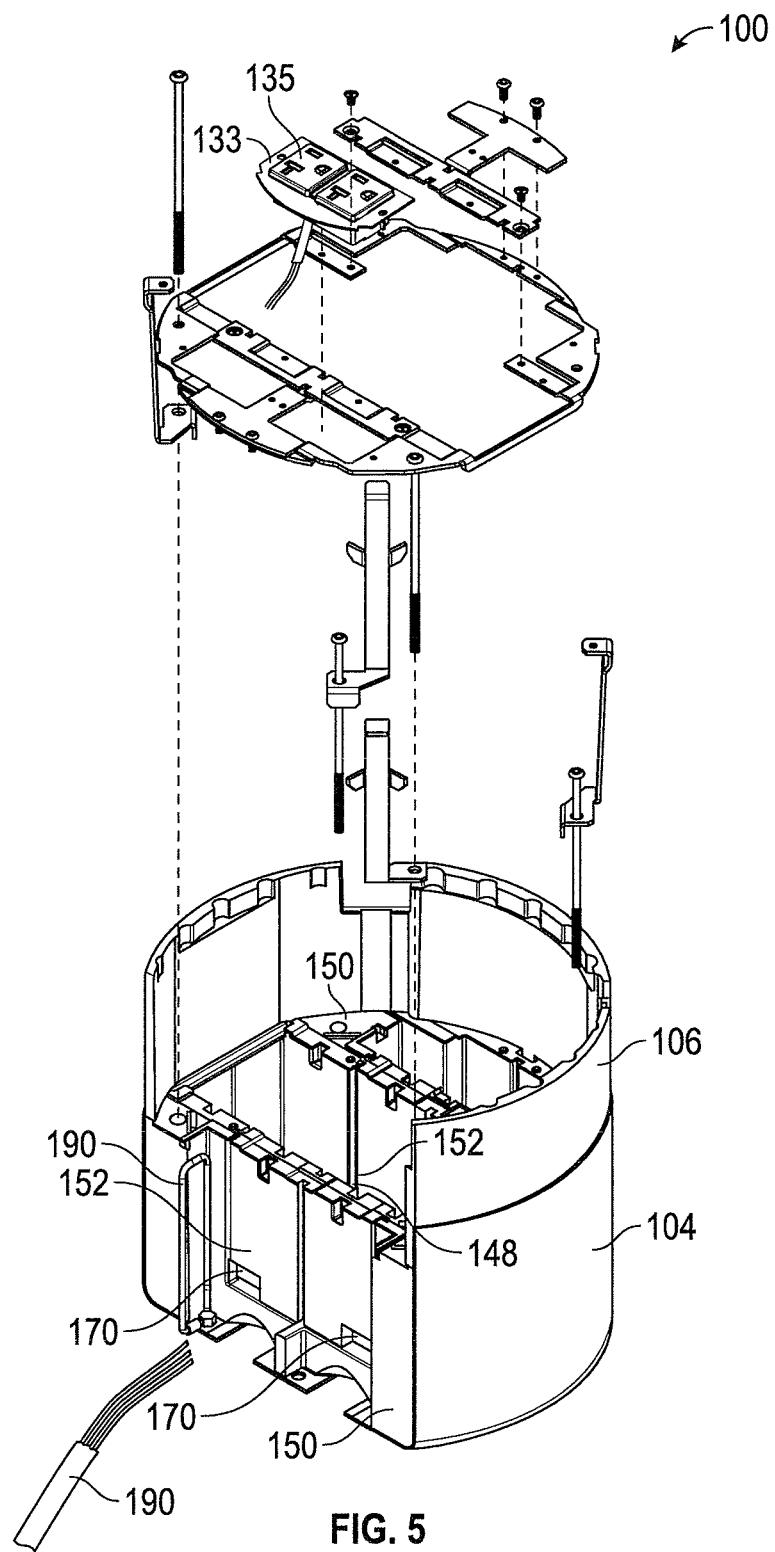
FIG. 5 is a partially cut away exploded view of the fitting shown in FIG. 1 with the cover assembly removed.

FIG. 5 shows a partially cut away exploded view of the fitting 100 with the cover assembly 102 removed. As is shown in FIG. 5, a lower body 148 that is preferably made of intumescent material sits below the upper body 106. The lower body 148 is made up of two half-bodies 150. Each half-body 150 includes a separable access wall 152. Access walls 152 are also preferably made of intumescent material.

Figure 6:
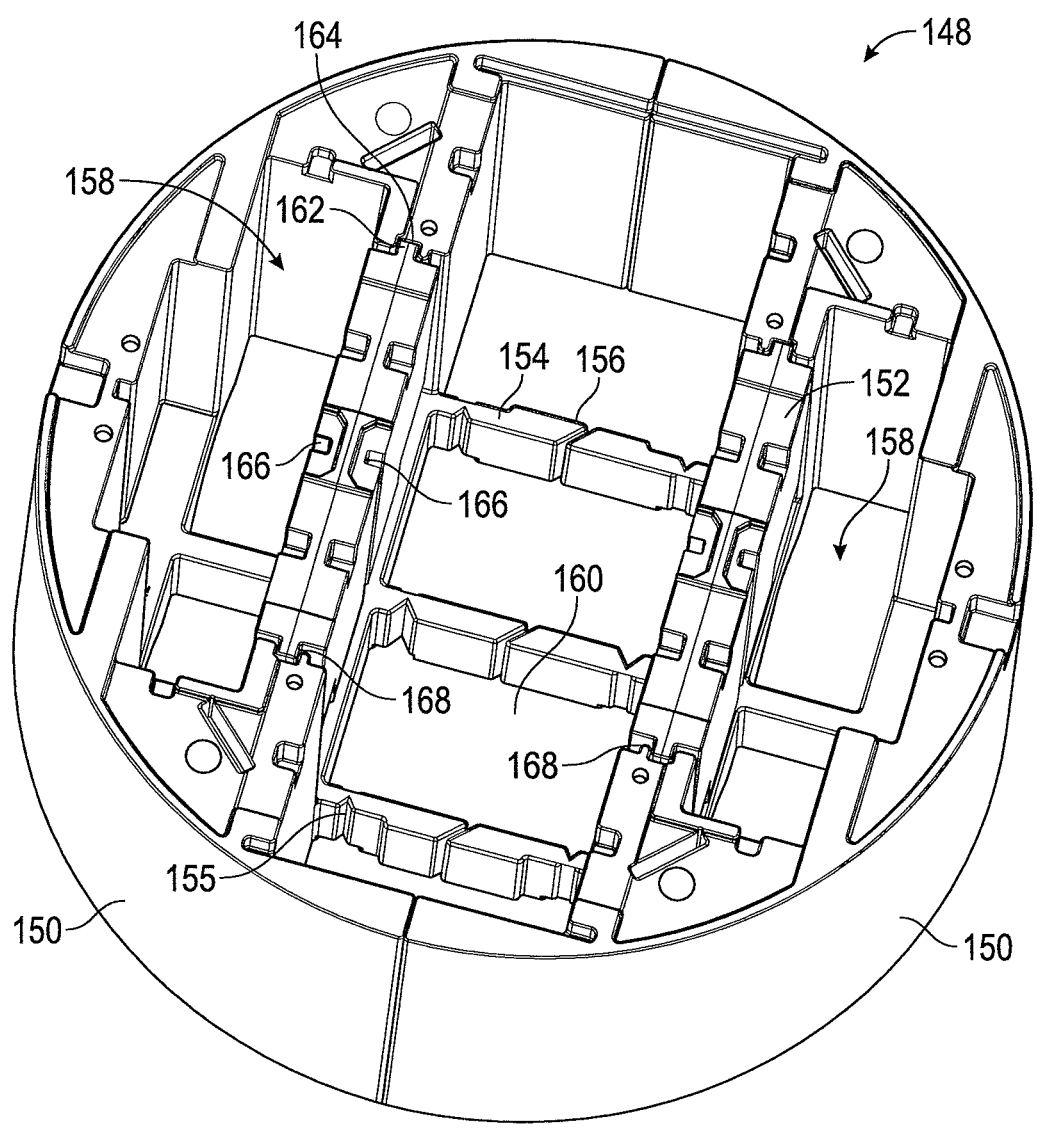
FIG. 6 is a perspective view of a lower body of the fitting shown in FIG. 1 with the removable access walls attached.

FIG. 6 shows a perspective view of the lower body 148 with the access walls 152 inserted. As shown in FIG. 6, ribs 154 extend from the bottom of each half-body 150 of the lower body. Each rib 154 ends with an angled surface 156 that mates with an angled surface on a corresponding rib on the other half-body when the two half-bodies are brought together. Walls on each half-body 150 along with the half-body's corresponding access wall 152 define a side compartment 158 for housing the back portions of installed power or data receptacles. Together, walls of the two half-bodies 150 along with the two access walls 152 define a middle compartment 160 for housing the back portions of more installed power or data receptacles. One or more ribs 154 can be deformed or detached when they block the proper routing of cables entering into the middle compartment 160. A notch 155 in each rib facilitates this deformation or detachments. Angled surfaces 156 allow two opposing ribs 154 to be easily moved away from each other without, for example, excessive friction.

The lower body 148 contains multiple compartments instead of a single central opening so that the fitting 100 can mount both power and data receptacles. Power cables and low-voltage data cables are required by code to be separated. Power cables and data cables cannot be routed in the same conduit or compartment either outside or inside of an electrical fitting. In fitting 100, each side compartment 158 is separated from middle compartment 160 by access wall 152 so that, for example, the side compartments can house power receptacles and the middle compartment 160 can house data receptacles or vice-versa. In a larger poke-through device such as, for example, a 10-in. diameter poke-through device, the side compartments 158 can be made large enough so that they can house not only the back portions of mounted devices, but also the required electrical connections, for example, the electrical connections between the power wires pre-connected to an installed electrical receptacle, wires in a building source power cable, and potentially the wires in one or more additional cables. Because the electrical connections can be housed inside of the small compartment 158, the electrical connections do not have to be made in a junction box located below the housing of the fitting as they do with known fittings, or in some other location below the housing. A junction box located below the housing of the fitting is not desirable because it increases the overall height of the fitting. Instead, the electrical connections can be made inside of the fitting as described in more detail below.

Figure 7:
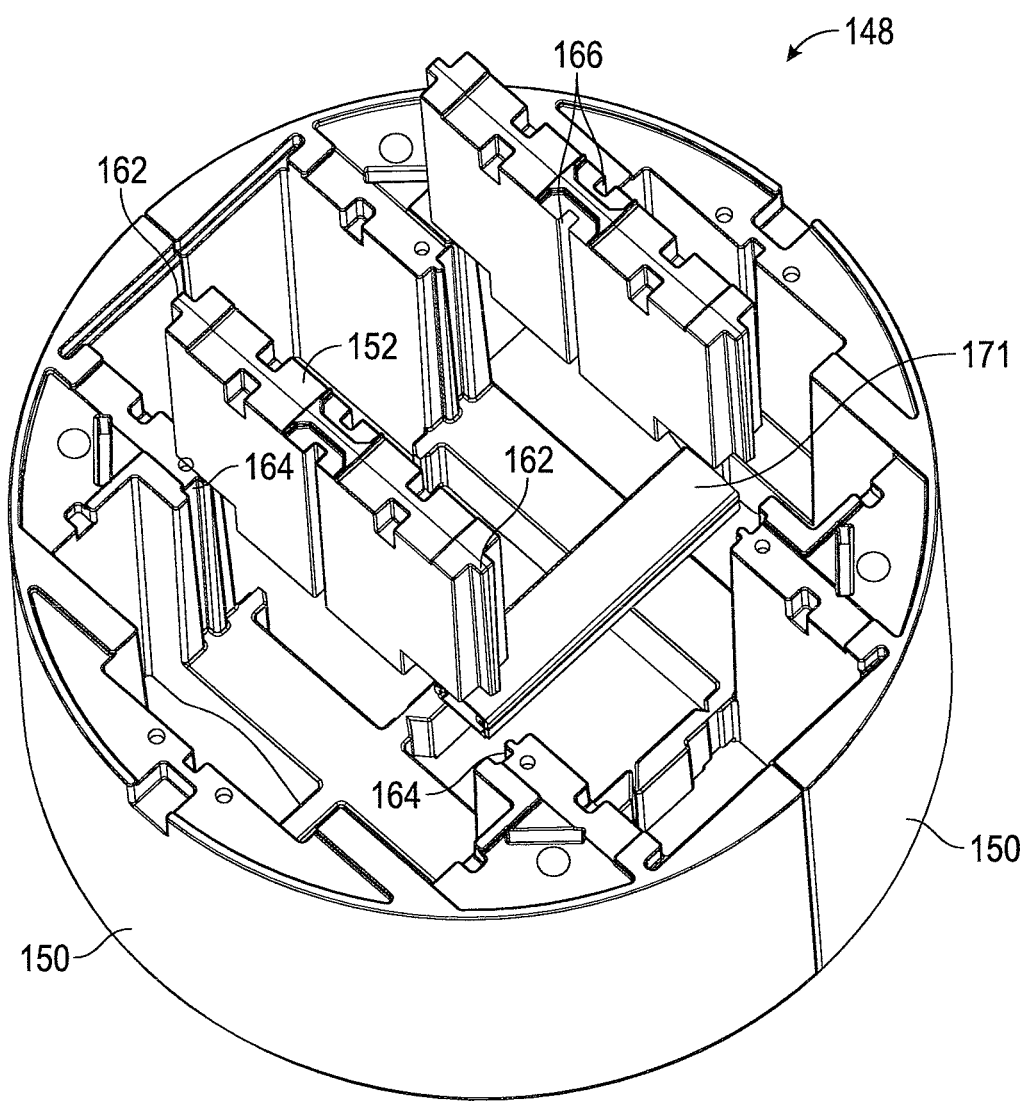
FIG. 7 is a partially exploded perspective view of the lower body of the fitting shown in FIG. 1 with an added conduit for routing cables or wires between two compartments.

As shown in FIGS. 6 and 7, each end of access wall 152 has a protrusion 162. Each protrusion can slide in a corresponding slot 164 in the corresponding half-body 150. The access wall also has two opposing slots 166 in its middle region. Adjacent to each protrusion 162, surfaces of access wall 152 and the half-body 150 on side of the middle compartment 160 together form a slot 168. Each of the slots 166 on the side of the middle compartment 160 and the slots 168 can receive an edge of a plate 169 (shown in FIG. 9) for further dividing the middle compartment 160. Thus, for example, middle compartment 160 can be divided into two or more compartments to provide the required separation to allow both power receptacles and data receptacles can be housed within the middle compartment 160. Each of the slots 166 on the side of a side compartment 158 can receive the edge of the plate 169 for further dividing the side compartment.

The bottom corners of access wall 152 have reduced thickness sections 170 (FIG. 5). One or both reduced thickness sections can be broken off to provide access between a side compartment 158 and central compartment 160. Corresponding reduced thickness sections 170 on both access walls 152 can be broken off to create a spatial path from one side compartment to the other side compartment. If both side compartments house power receptacles, then power wires can be routed from one side compartment to the other in conduit 171 (FIG. 7) that passes through the openings created by the removed reduced thickness sections on the access walls 152. In known poke-through fittings, power wires are not so easily and efficiently passed from one side compartment to the other side compartment within the height of the intumescent body. Instead, in known poke-through fittings the power wires are passed from one side to another via a passageway formed by a sheet-metal cover mounted to the bottom of the metal housing of the fitting, thus increasing the overall height of the fitting. Alternatively, a separate building source power cable is routed into each of the two side compartments in known poke-through fittings, thereby increasing the infrastructure required to power the fitting.

Power receptacles can be installed on the sides of the fitting and connected to building source power in the following manner. First, main-compartment gang plates 136 are removed from main bracket 114 and access walls 152 are removed from half-bodies 150 of the lower intumescent body 148. At least one reduced thickness section 170 on each access wall is removed either with a pair of pliers or by hand. A conduit 171 is then positioned at a location such that it will pass through each access wall when the access walls are reinserted at an opening created by the removal of a reduced thickness section. A power cable is routed through the conduit so that one of its ends passes through one of the side compartments 158 and the other of its ends passes through the other side compartment 158. The access walls 152 are then reinserted into the half-bodies such that the conduit passes through each access wall at an opening created by removing a reduced thickness section of the access wall. Main-compartment gang plates 136 are then screwed back on to main bracket 114 to help secure the access walls 152. The end of a building source power cable is passed through a conduit plate 178 (shown in FIG. 8; described in more detail below) mounted to the bottom of the housing 104 at a location beneath one of the side compartments 158 and is further passed through the side compartment 158. At a location above that side compartment 158, the ends of wires of a receptacle unit that is already mounted on its respective mounting plate is brought in the vicinity of the ends of the wires of the source building power cable and the ends of the wires of the cable passing through the conduit. Wires of the same polarity (hot, neutral, or ground) from each of the building source power cable, the cable passing through the conduit and the wires extending from the receptacle are then electrically connected to each other by, for example, wire nuts (the ground wires are also connected to a ground wire 190 (shown in FIG. 5) that has one end mounted to the housing 104. The connections are then pushed into the side compartment. The mounting plate for the receptacle can then be screwed on to the bracket 114 and, if required, the small compartment gang plate to fully or partially close the side compartment 158. Similarly electrical connections between the opposite ends of the wires in the cable passing through the conduit and the wires of a second receptacle unit that is pre-mounted onto a mounting plate can be made above the other side compartment 158. Once made, the connections can be pushed inside that side compartment 158 and the mounting plate for the receptacle unit can be screwed onto bracket 114 and, if required, the small compartment gang plate to fully or partially close that side compartment 158.

Figure 8:
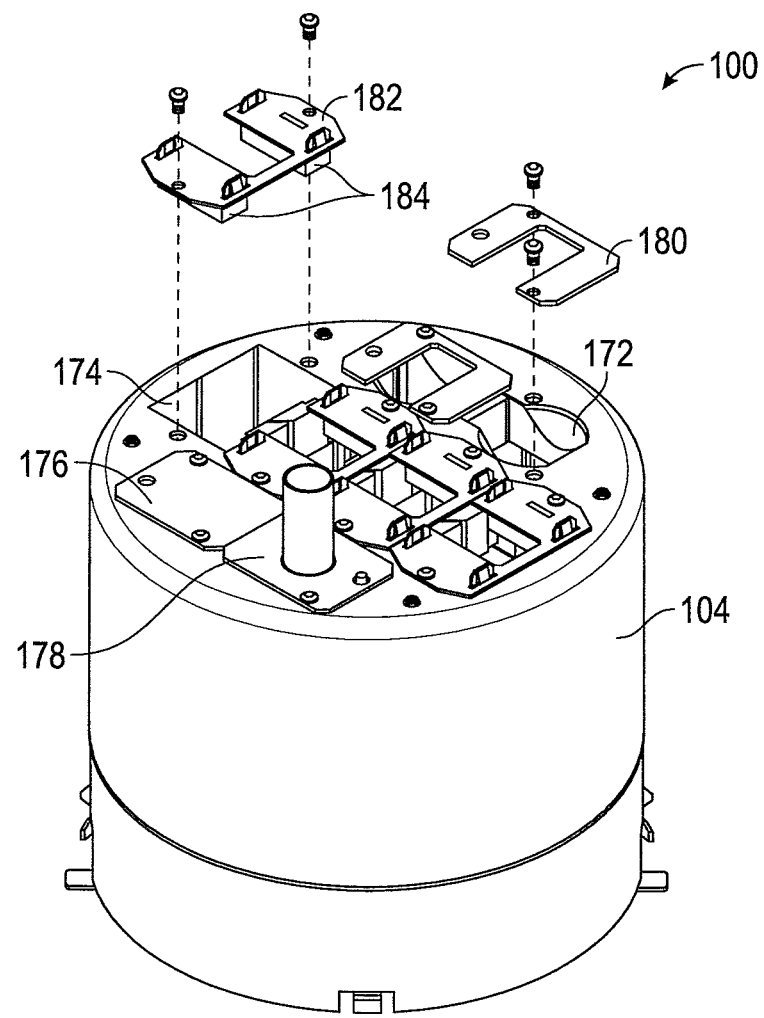
FIG. 8 is a partially exploded perspective view of the bottom of the fitting shown in FIG. 1.

FIG. 8 shows a partially exploded perspective view of the bottom of the fitting 100. The housing has openings 172 corresponding to the locations of side compartments 158 and an opening 174 corresponding to the location of middle compartment 160. Screw holes run along the sides of opening 172. The screw holes are for mounting plates, such as blank plate 176, conduit plate 178, and feed plate 180. Conduit plate 178 can be used to connect fitting 100 to an electrical conduit (not shown) housing a building supply power cable and provides an opening for that power cable to enter the small compartment 158. Feed plate 180 can be mounted at a location where a building data cable will enter the small compartment 158. Any combination of two conduit, feed, or blank plates can be used for an opening 172. Similarly, screw holes run along the sides of opening 174, for example four pairs of screw holes. The screw holes are for mounting plates, such as middle-compartment feed plate 182. Middle-compartment feed plate 182 is similar to feed plate 180 but is larger than feed plate 180 and can also secure intumescent blocks 184 via clips. Middle-compartment conduit plates and middle-compartment blank plates similar to plates 178 and 176, respectively, can also be attached via the screw holes along the side of opening 174. Any combination of four feed, conduit, or blank plates can be used along opening 174. Alternatively, larger two-gang middle-compartment feed, conduit, or blank plates can take the place of two single-gang plates. Use of a two-gang middle-compartment conduit plate can place the conduit opening directly below a set of ribs 154 extending from the half-bodies 150 and may call for deformation or detachment of that set of ribs as described above.

Figure 9:
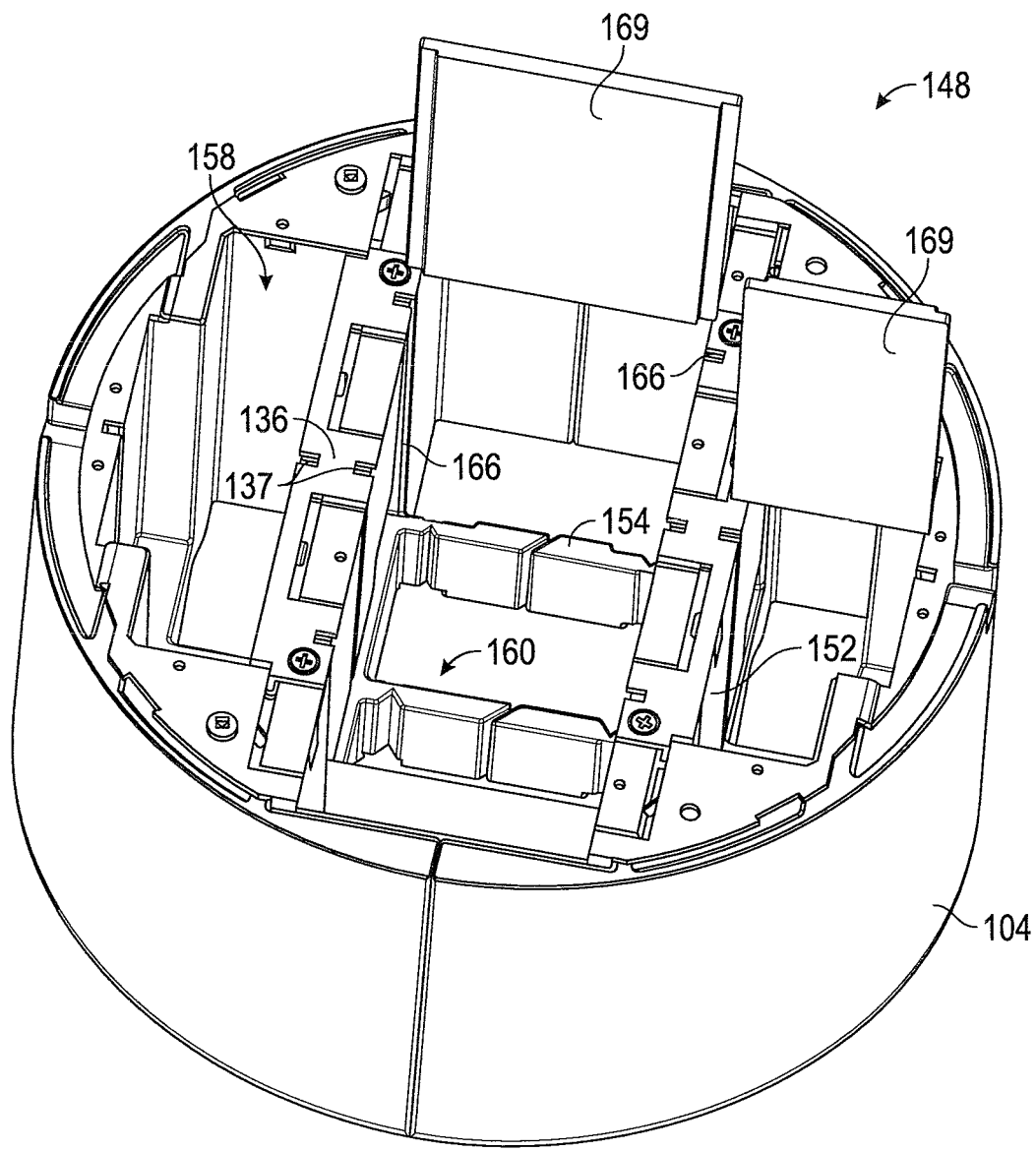
FIG. 9 is a partially exploded perspective view of the bottom of the fitting shown in FIG. 1 with divider walls.

Referring to FIG. 9, the plate 169, also referred to as a divider plate, can be inserted into slots 166. The slits 137 formed within the gang late 136 are in register with the slots 166 formed in the access wall 152 and allow the divider plate 169 to be slid therethrough. Thus, the fitting 100 can be configured with walls 152, plates 169, ribs 154, and conduits 171 as necessary depending on desired functionality of each fitting 100. The modular walls 152 additionally allow connectivity between compartments when the reduced sections 170 are removed.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

What is claimed is:

1. An electrical fitting comprising:
   a housing forming a compartment;
   a wall dividing the compartment into a first portion and a second portion;
   a cover assembly disposed at an upper end of the housing, the cover assembly including a ring portion and a lid portion, the lid portion being hingedly attached to the ring portion and including a gasket configured to contact the ring portion when the lid portion is closed, the ring portion defining a central passage through the cover assembly into the housing; and
   an intumescent portion secured to the cover assembly by screws;
   wherein the intumescent portion is configured to close openings within the housing when heated so that a fire cannot pass through the openings.

2. The electrical fitting according to claim 1, wherein the cover assembly includes a lid hingedly attached to the ring portion, the lid closing the central passage when in a closed position.

3. The electrical fitting according to claim 1, wherein the ring portion of the cover assembly comprises:
   a ring-shaped sleeve forming the central passage; and
   a flange formed at an upper end of the ring-shaped sleeve, the flange extending radially outward from the ring-shaped sleeve.

4. The electrical fitting according to claim 3, wherein the cover assembly includes a lid hingedly attached to the ring portion, the lid closing the central passage when in a closed position.

5. The electrical fitting according to claim 4, wherein an upper surface of the lid is flush with an upper surface of the flange when the lid is in the closed position.

6. The electrical fitting according to claim 1, further comprising a body made of intumescent material located within the housing, the body including the wall defining the first portion and the second portion.

7. The electrical fitting according to claim 6, further comprising a first access wall made of intumescent material inserted in the body between the first portion and the second portion and aligned with the wall.

8. The electrical fitting according to claim 7, wherein the first access wall has at least one reduced thickness section adapted to be broken off from the first access wall.

9. The electrical fitting according to claim 1, wherein the intumescent portion is secured to the housing by two screws.

10. The electrical fitting according to claim 1, further comprising a bracket assembly disposed within the housing, the bracket assembly configured to receive at least one electrical or data receptacle.

11. An in-floor electrical fitting comprising:
a housing;
a wall dividing an interior of the housing into a first compartment and a second compartment;
a cover assembly disposed at an upper end of the housing, the cover assembly defining a central passage into the housing and including a lid configured to close the central passage when in a closed position, the lid portion including a gasket configured to seal the central passage when the lid portion is in the closed position; and
an intumescent portion secured to the cover assembly by screws;
wherein the intumescent portion is configured to close openings within the housing when heated so that a fire cannot pass through the openings.

12. The in-floor electrical fitting according to claim 11, wherein the cover assembly includes a ring portion forming the central passage, and wherein the lid is hingedly attached to the ring portion.

13. The in-floor electrical fitting according to claim 12, wherein the ring portion of the cover assembly comprises:
a ring-shaped sleeve forming the central passage; and
a flange formed at an upper end of the ring-shaped sleeve, the flange extending radially outward from the ring-shaped sleeve.

14. The in-floor electrical fitting according to claim 13, wherein an upper surface of the lid is flush with an upper surface of the flange when the lid is in the closed position.

15. The in-floor electrical fitting according to claim 11, further comprising a body made of intumescent material located within the housing, the body including the wall defining the first compartment and the second compartment.

16. The in-floor electrical fitting according to claim 15, further comprising a first access wall made of intumescent material inserted in the body between the first compartment and the second compartment and aligned with the wall.

17. The in-floor electrical fitting according to claim 16, wherein the first access wall has at least one reduced thickness section adapted to be broken off from the first access wall.

18. The in-floor electrical fitting according to claim 11, wherein the intumescent portion is secured to the housing by two screws.

19. The in-floor electrical fitting according to claim 11, further comprising a bracket assembly disposed within the housing, the bracket assembly configured to receive at least one electrical or data receptacle.

20. The in-floor electrical fitting according to claim 19, wherein the bracket includes a first opening associated with the first compartment for receive a first electrical or data receptacle and a second opening associated with the second compartment for receiving a second electrical or data receptacle.

* * * * *